US007293009B2

(12) United States Patent
Jacobs et al.

(10) Patent No.: US 7,293,009 B2
(45) Date of Patent: Nov. 6, 2007

(54) SYSTEM AND METHOD FOR FLUSHING BEAN CACHE

(75) Inventors: Dean Bernard Jacobs, Berkeley, CA (US); Rob Woollen, San Francisco, CA (US); Seth White, San Francisco, CA (US)

(73) Assignee: BEA Systems, Inc., San Jose, CA (US)

( * ) Notice: Subject to any disclaimer, the term of this patent is extended or adjusted under 35 U.S.C. 154(b) by 298 days.

(21) Appl. No.: 11/105,263

(22) Filed: Apr. 13, 2005

(65) Prior Publication Data

US 2005/0177550 A1 Aug. 11, 2005

Related U.S. Application Data

(63) Continuation of application No. 10/212,382, filed on Aug. 5, 2002, now Pat. No. 6,918,013.

(60) Provisional application No. 60/335,633, filed on Oct. 25, 2001, provisional application No. 60/316,187, filed on Aug. 30, 2001.

(51) Int. Cl.
*G06F 15/16* (2006.01)
*G06F 12/00* (2006.01)
*G06F 7/00* (2006.01)
*G06F 13/00* (2006.01)

(52) U.S. Cl. .................. 707/1; 711/145; 711/135; 711/113; 707/8; 707/201; 709/203

(58) Field of Classification Search ............ None
See application file for complete search history.

(56) References Cited

U.S. PATENT DOCUMENTS 4,714,996 A * 12/1987 Gladney et al. ............ 707/203

| 5,163,148 | A | 11/1992 | Walls |
| 5,212,793 | A | 5/1993 | Donica et al. |
| 5,249,290 | A | 9/1993 | Heizer |
| 5,613,060 | A | 3/1997 | Britton et al. |
| 5,761,507 | A | 6/1998 | Govett et al. |
| 5,765,171 | A | 6/1998 | Gehani et al. |
| 5,768,504 | A | 6/1998 | Kells et al. |
| 5,774,689 | A | 6/1998 | Curtis et al. |
| 5,802,291 | A | 9/1998 | Balick et al. |
| 5,805,798 | A | 9/1998 | Kearns et al. |
| 5,819,107 | A | 10/1998 | Lichtman et al. |
| 5,909,689 | A | 6/1999 | Van Ryzin |
| 5,910,180 | A | 6/1999 | Flory et al. |
| 5,926,775 | A | 7/1999 | Brumley et al. |

(Continued)

OTHER PUBLICATIONS

BEA Systems, Inc., "WebLogic Server 6.1," Sep. 19, 2001, 36 pages.

(Continued)

*Primary Examiner*—Hyung Sough
*Assistant Examiner*—Mardochee Chery
(74) *Attorney, Agent, or Firm*—Fliesler Meyer LLP

(57) ABSTRACT

Servers in a network cluster can each store a copy of a data item in local cache, providing read access to these copies through read-only entity beans. The original data item in the database can be updated through a read/write entity bean one of the cluster servers. That cluster server has access to an invalidation target, which contains identification information relating to copies of the data item stored on servers in the cluster. Once the read/write bean updates the data item in the database, an invalidate request can be sent or multicast to all cluster members, or to any read-only bean or server contained in the invalidation target. Each server or read-only bean receiving the request knows to drop any copy of the data item in local cache, and can request a current copy of the data item from the database.

20 Claims, 6 Drawing Sheets

U.S. PATENT DOCUMENTS

| | | |
|---|---|---|
| 6,018,805 A | 1/2000 | Ma et al. |
| 6,055,243 A | 4/2000 | Vincent et al. |
| 6,122,629 A | 9/2000 | Walker et al. |
| 6,134,673 A | 10/2000 | Chrabaszcz |
| 6,173,327 B1 | 1/2001 | De Borst et al. |
| 6,189,046 B1 | 2/2001 | Moore et al. |
| 6,212,521 B1 | 4/2001 | Minami et al. |
| 6,212,556 B1 | 4/2001 | Arunachalam |
| 6,243,753 B1 | 6/2001 | Machin et al. |
| 6,269,373 B1 | 7/2001 | Apte et al. |
| 6,338,089 B1 | 1/2002 | Quinlan |
| 6,343,287 B1 | 1/2002 | Kumar et al. |
| 6,389,462 B1 | 5/2002 | Cohen et al. |
| 6,405,219 B2 | 6/2002 | Saether et al. |
| 6,411,956 B1 | 6/2002 | Ng |
| 6,425,005 B1 | 7/2002 | Dugan et al. |
| 6,438,705 B1 | 8/2002 | Chao et al. |
| 6,453,356 B1 | 9/2002 | Sheard et al. |
| 6,466,972 B1 | 10/2002 | Paul et al. |
| 6,505,200 B1 * | 1/2003 | Ims et al. ............... 707/8 |
| 6,505,241 B2 | 1/2003 | Pitts |
| 6,523,130 B1 | 2/2003 | Hickman et al. |
| 6,539,381 B1 | 3/2003 | Prasad et al. |
| 6,542,845 B1 | 4/2003 | Grucci et al. |
| 6,567,809 B2 | 5/2003 | Santosuosso |
| 6,687,848 B1 | 2/2004 | Najmi |
| 6,721,777 B1 | 4/2004 | Sharma |
| 6,757,708 B1 * | 6/2004 | Craig et al. ............... 709/203 |
| 6,775,703 B1 | 8/2004 | Burns et al. |
| 6,779,017 B1 | 8/2004 | Lamberton et al. |
| 6,826,601 B2 | 11/2004 | Jacobs et al. |
| 6,832,238 B1 | 12/2004 | Sharma et al. |
| 6,944,785 B2 | 9/2005 | Gadir et al. |
| 6,963,857 B1 | 11/2005 | Johnson |
| 6,983,465 B2 | 1/2006 | Mandal et al. |
| 7,100,195 B1 | 8/2006 | Underwood |
| 7,171,692 B1 * | 1/2007 | DeMello et al. ............... 726/26 |
| 2001/0054062 A1 | 12/2001 | Ismael et al. |
| 2002/0073188 A1 | 6/2002 | Rawson |
| 2002/0147961 A1 | 10/2002 | Charters et al. |
| 2002/0161839 A1 | 10/2002 | Colasurdo et al. |
| 2003/0018732 A1 | 1/2003 | Jacobs et al. |
| 2003/0041135 A1 | 2/2003 | Keyes et al. |
| 2003/0046286 A1 | 3/2003 | Jacobs et al. |
| 2003/0060214 A1 | 3/2003 | Hendry et al. |
| 2006/0168118 A1 | 7/2006 | Godlin et al. |

OTHER PUBLICATIONS

Flowers, Brady, "The J2EE Connector Architecture," Sys-con Media, http://www.sys-con.com/read/36268.htm, May 1, 2001, 4 pages.

International Search Report for PCT/US03/26891 dated Mar. 26, 2004, 3 pages.

International Search Report for PCT/US03/22875 dated Apr. 9, 2004, 4 pages.

International Search Report for PCT/US03/03457 dated Jul. 10, 2003, 4 pages.

Kooijmans, Alex Louwe, et al., Enterprise JavaBeans for z/OS and OS/390 WebSphere Application Server V4.0, IBM, pp. 31-78 and 185-240 (Dec. 2001).

Marinescu, Floyd, "BEA WebLogic Server 6.1 has been released," The ServerSide.com, Jul. 31, 2001, 1 page.

Newport, Billy, "JMX," http://theserverside.com/tt/articles/content/JMX/article.html, 6 pages (2001).

Rodoni, Jennifer, "The J2EE Connector Architecture's Resource Adapter," Sun Systems, 12 pages (Dec. 2001).

Sarathy, Vijay, et al., "Integrating Java Applications with the Enterprise," EAI Journal, pp. 50-54 (May 2001).

Stanhope, Jane, "J2EE Connector Architecture Promises to Simplify Connection to Back-End Systems," Giga Information Group, Nov. 16, 2000, 4 pages.

Stearns, Beth, "Using the J2EE Connector Architecture Common Client Interface," Sun, 10 pages (Apr. 2001).

Visveswaran, Siva, "Dive into Connection Pooling with J2EE," reprinted from JavaWorld, 7 pages (Oct. 2000).

\* cited by examiner

SYSTEM AND METHOD FOR FLUSHING BEAN CACHE

CLAIM OF PRIORITY

This application is a Continuation of application Ser. No. 10/212,382 filed on Aug. 5, 2002 now U.S. Pat. No. 6,918,013, entitled: "System and Method for Flushing Bean Cache," which claims priority to U.S. Provisional Patent Application No. 60/335,633, filed Oct. 25, 2001, entitled "SYSTEM AND METHOD FOR FLUSHING BEAN CACHE," and to U.S. Provisional Patent Application No. 60/316,187, filed Aug. 30, 2001, entitled "CLUSTER CACHING WITH CONCURRENCY CHECKING," incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference:

U.S. Provisional Application No. 60/305,986 entitled "DATA REPLICATION PROTOCOL," by Dean Bernard Jacobs, Reto Kramer, and Ananthan Bala Srinvasan, filed Jul. 16, 2001.

U.S. Provisional Application No. 60/316,187 entitled "CLUSTER CACHING WITH CONCURRENCY CHECKING," by Dean Bernard Jacobs and Rob Woollen, filed Aug. 30, 2001.

TECHNICAL FIELD

The invention relates generally to a system and method for storing data on a network.

BACKGROUND

When a data item is stored in a single database or data store that is accessible over a network, it is often the case that multiple servers or clients will require access to that data item. Traditionally, this requires a hit to the database each time the data item is accessed. Each hit to a database is relatively resource intensive and relatively inefficient.

One way of overcoming some of the efficiency and scalability problems is to store a local copy of the data item in cache memory. A server or client can then use that local copy if future access to the data item is needed. This process may be appropriate and efficient for data items that never change, but problems can arise when a data item is updated in the database.

If a data item in the database is updated, a copy of that data item stored in a local cache on the network will be different than the item in the database, as the cache will not automatically receive the update. The problem intensifies when there are local copies on multiple servers and/or clients on the network. Since each of these local copies is created at a different time, there can be multiple versions of the data item on the network. If a user tries to update or view the data item, the copy accessed by the user may not be current and correct.

Such a problem with data latency can cause serious problems for applications that require near real-time accuracy, such as web sites that offer "real time" stock prices. Such an application might utilize a database table having at least two columns, one column containing stock symbols, which can be used as primary keys for the table, and one column containing the current price of each stock. In such an application, most of the activity involves users accessing the site and reading the current stock values. There is typically also activity involving back-end applications or systems that come in periodically, such as once every minute, with updated stock prices. These back-end systems need read/write access to the database in order to update the data.

Most access to the system will be read only. For these read-only users, the system can cache data to provide faster access. The system can update the cached information periodically, such as every fifteen minutes. In such a "read-mostly" situation, however, it may be preferable to give a user the most recent data. A fifteen minute delay in providing accurate information may be undesirable for many applications. It is typically desirable to give users information that is as accurate as possible.

One way to ensure that users get accurate information, or at least information that is current with data stored in the database, is to pull the information from the database for each request instead of reading a cached copy. This can be very expensive for many applications, as a hit to a database is much more time and resource intensive than reading a value from memory.

For people updating the data in the database, it may be desirable to wrap as many updates as possible into a batch transaction in order to improve performance. Wrapping updates into a single transaction also ensures that either all the updates occur or none of the updates occur. Problems arise, however, in how to update cached copies for each item updated in a transaction.

BRIEF SUMMARY

A system and method are included for updating a copy of a data item stored in local cache on at least one server in a network cluster. Identification information is provided to a read/write bean stored on a server in the cluster. The identification information relates to any server in the cluster that contains a read-only bean and a copy of the data item in local cache. A read-only bean provides read access to the local copy of the data item. The original data item is stored in a network database, and is updated using the read/write bean. When the data item is updated by the read/write bean, an invalidate request can be sent or multicast from the server containing the read/write bean to the entire cluster, or can be sent to any server or read-only bean identified by the identification information having a local copy of the data item. Any local copy of the data item can then be dropped in response to the request. A current copy of the data item can be read from the database and stored in local cache.

DETAILED DESCRIPTION

Figure 1:
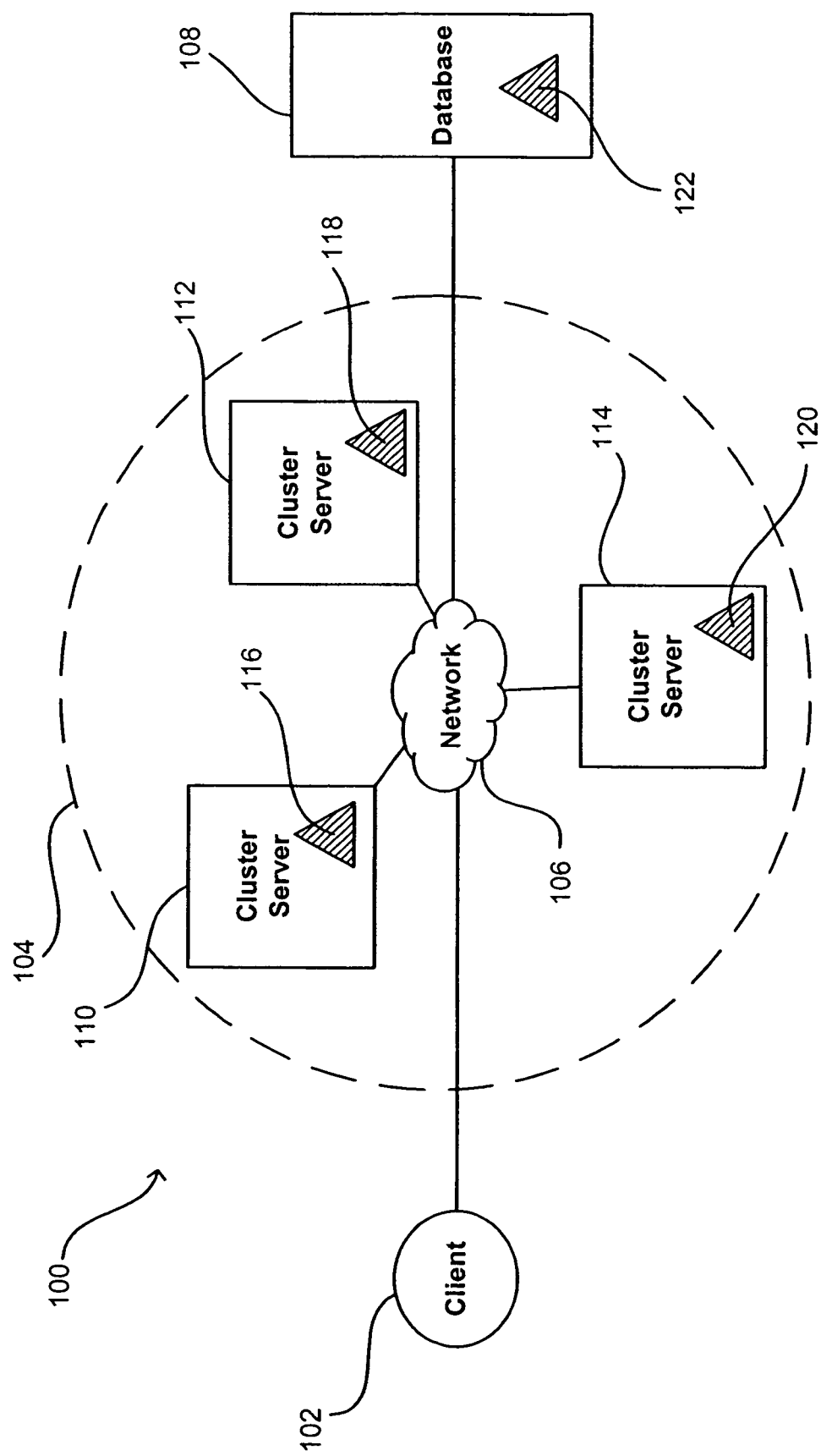
FIG. 1 is a diagram of a system in accordance with one embodiment in accordance with the present invention.

In order to maintain consistency among items distributed on a network, a system in accordance with the present invention can take advantage of beans, or JavaBeans. A bean is basically a framework for components that can be added to a server to extend functionality. One embodiment utilizes two types of beans, "read-only" entity beans and "read/write" entity beans. An entity bean is a bean that is persistent, allows shared access, has primary keys, and can participate in relationships with other entity beans. Each entity bean can have an underlying table in a relational database, with each instance of the bean corresponding to a row in that table.

A read-only bean is a bean that can be cached on a server, such as an enterprise JavaBean that resides in a network cluster. The read-only bean can provide read access to any server in the cluster, as well as to any client inside or outside of the cluster. The read/write bean is transactional, residing on a server in the cluster and providing cluster servers with read/write access to a network database. The read-only bean deals with data in local cache on a cluster server. The read/write bean deals with information in a database.

One way to address the concurrency of information in the cache and in the database is to associate a timeout value with each read-only entity bean. For example, a read-only bean can be deployed with a default cycle of ten minutes. After each period of ten minutes passes, the read-only bean goes back to the database and reads the current value. This approach can work well for certain applications, such as those applications with values that change at a regular interval.

There may be applications, however, which have data that changes very infrequently. When this data changes, users may want to know about the change as soon as possible. Since the data does not change very often, it is tempting to set a long read cycle time in order to conserve resources. This can have the undesirable effect, however, of creating latency issues with the data, as the resultant delay in updating the data can be almost as long as the cycle time, depending on the point in the cycle at which the update occurs. For such applications, it is desirable that the data accessible by a read-only user is updated as soon as possible after the data is the database is updated.

One system in accordance with the present invention provides an interface, exposed by a read-only bean. The interface allows a user or application to tell the system to drop a cache, or "invalidate" a cache, when the user updates a data item or is aware of an update. This interface shall be referred to as a "CachingHome," as an entity bean typically has a "home" or factory that creates it. CachingHome can have three methods on it, and be coded as follows:

```
package weblogic.ejb;
public interface CachingHome {
    public void invalidate(Object pk) throws RemoteException;
    public void invalidate(Collection pks) throws RemoteException;
    public void invalidateAll( ) throws RemoteException;
}
```

The method invalidate (Object pk) lets a user invalidate data associated with a particular primary key in a database or data table. The method invalidate(Collection pks) lets a user invalidate data for a collection or group of keys. The method invalidateAll( ) allows a user to invalidate data for all keys in the database table. These invalidate methods allow a user to ensure that values are stored in local cache until a programmer, application, user, or system says otherwise.

Figure 5:
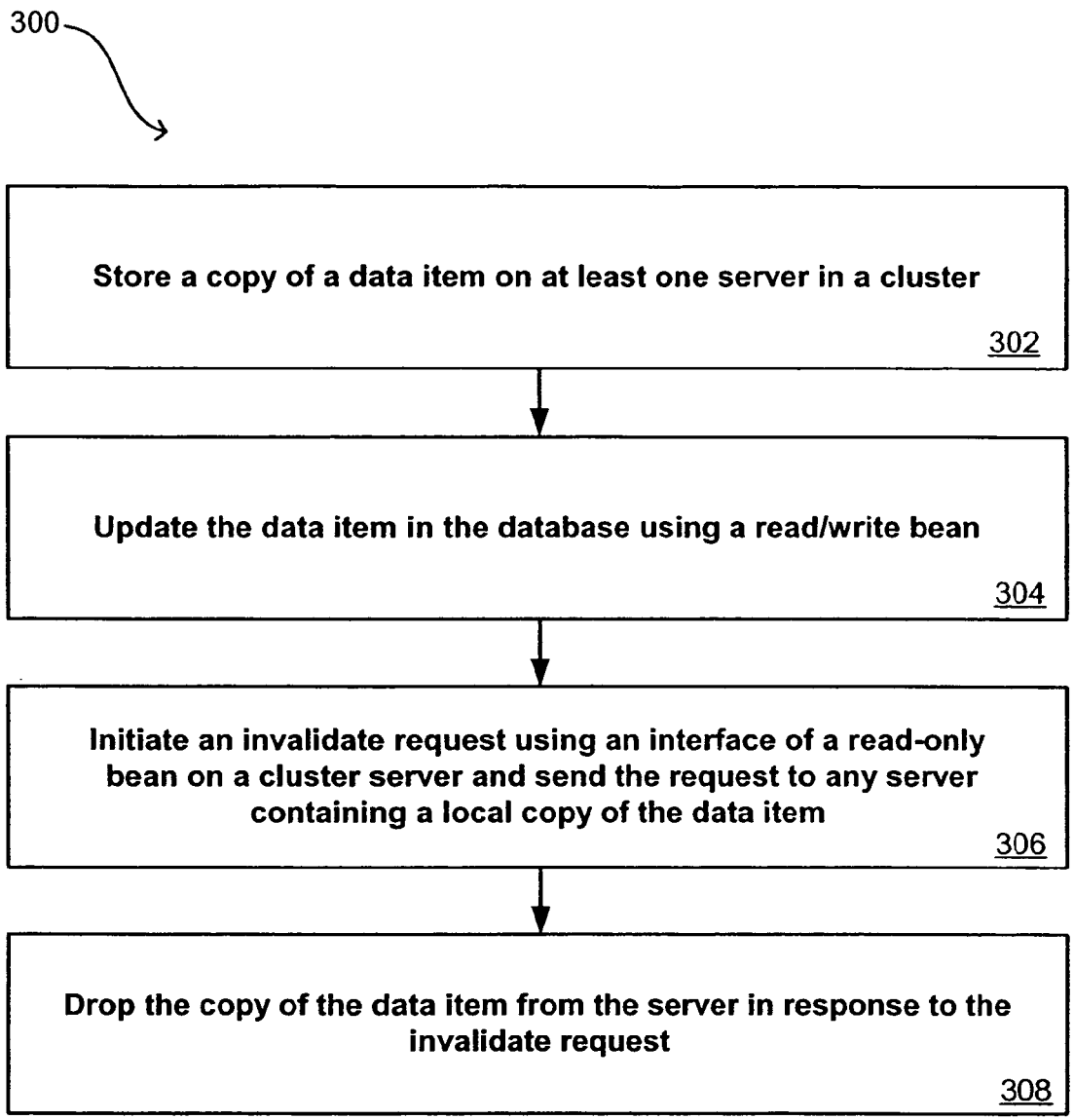
FIG. 5 is a flowchart for a method in accordance with another embodiment of the present invention.

One such method 300 is shown in the flowchart of FIG. 5. A copy of a data item is stored on at least one server in a network cluster 302. The data item can be updated in the database using a read/write bean on one of the cluster servers 304. An invalidate request can then be initiated using an interface of a read-only bean located on one of the servers, the request being sent to any server containing a local copy of the data item 306. Any copy of the data item can then be dropped from a server receiving the request 308.

In a system 100 with a network cluster 104, such as is shown in FIG. 1, it is possible that a copy of a value 122 stored in a database 108 is cached on each server 110, 112, 114 in the cluster 104. If a client 102 contacts server 110 through the network 106 and requests that server 110 invalidate a given key, such as by making the request "invalidate (Key)," it is easy for server 110 to drop its cached copy 116 of the value 122 or values associated with that key. A problem exists, however, in how to get servers 112 and 114 to drop their cached copies 118, 120 as well.

Figure 2:
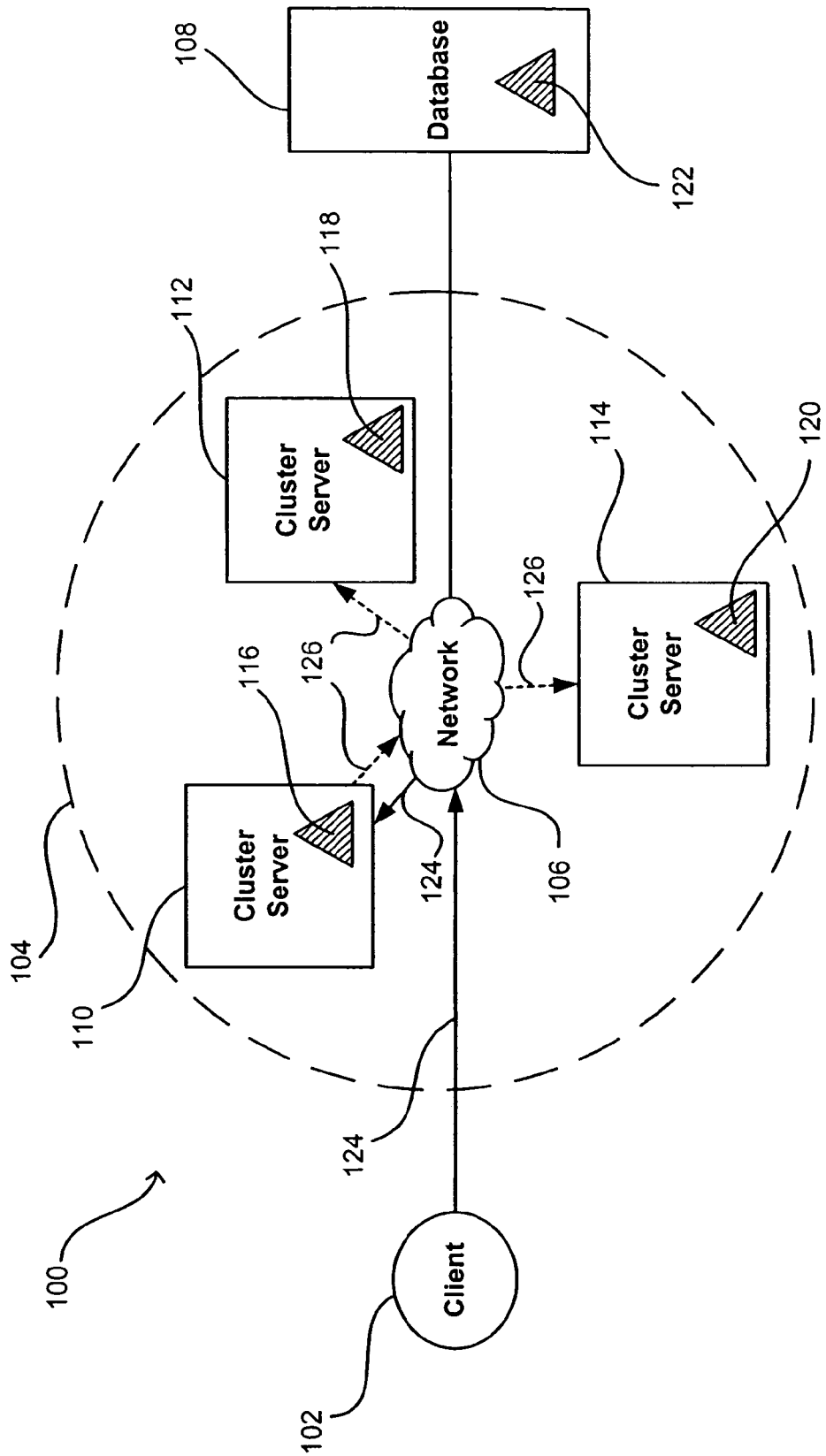
FIG. 2 is a diagram of a system in accordance with the embodiment of FIG. 1.

One embodiment allows server 110 to drop a copy 116 in local cache when it receives an invalidate request 124 from the client 102, as shown in FIG. 2. After dropping the copy 116 from local memory, server 110 can send a message 126 on multicast to the other servers 118, 120 or read-only beans in the cluster 104 to drop the copy of the value in local cache. Multicast is a technique for sending a packet of information or a message from one server, or source, to other servers without having any unnecessary packet duplication, as one packet is sent from the source and replicated across the network as needed. This approach allows each server to drop the cached value when the value in the database is updated.

Figure 6:
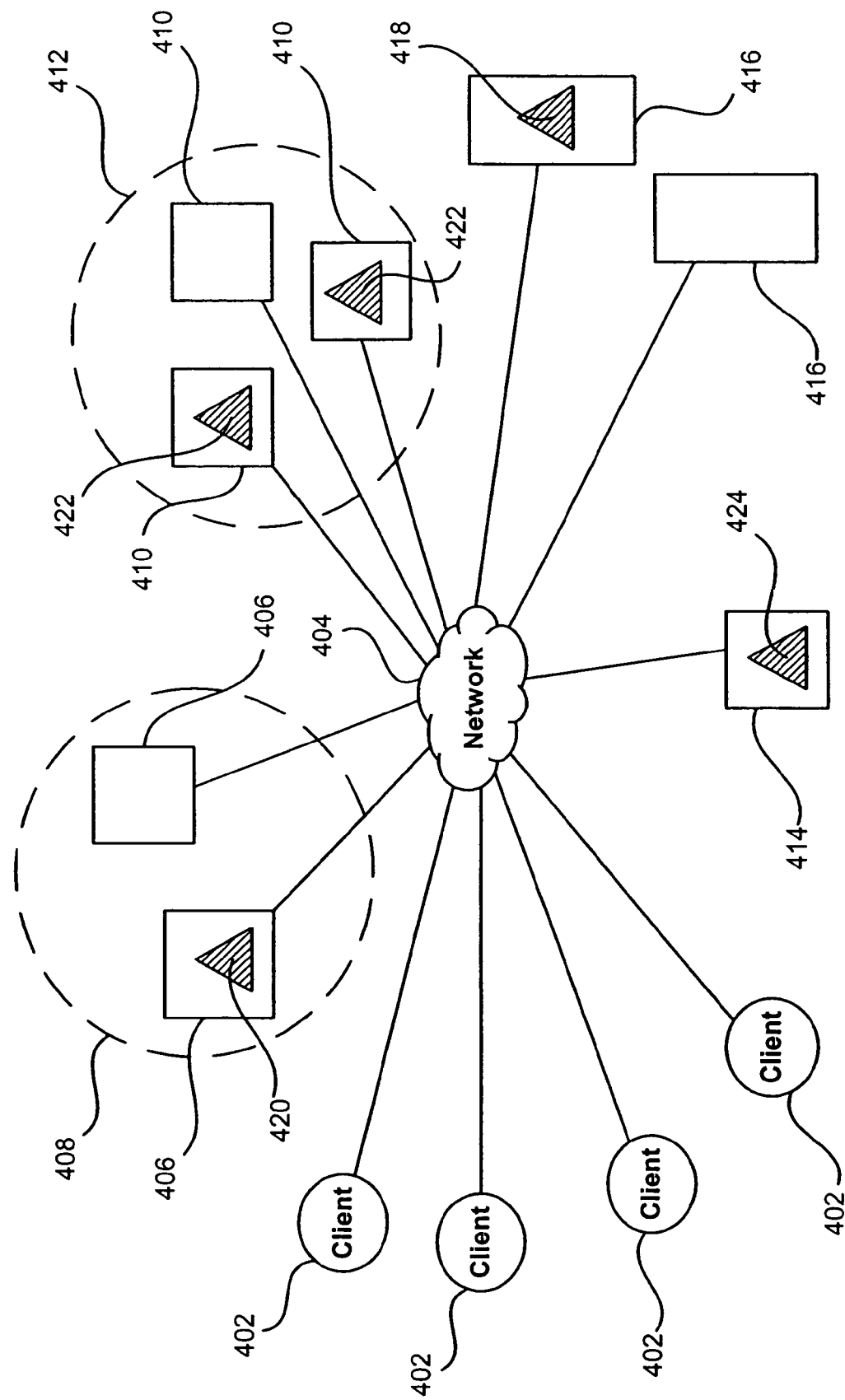
FIG. 6 is a diagram of a system in accordance with another embodiment in accordance with the present invention.

FIG. 6 shows another system which includes multiple clients 402 and multiple databases 416 in communication with the network 404. A data item 418 is stored in one of the databases 416. A copy 420 of the data item is stored in a cluster server 406 of cluster 408. There are two copies 422 stored in cluster servers 422 of cluster 412, as well as a copy 424 on server 414, which is not contained in any server cluster. This system would work similar to the system of FIGS. 1 and 2, in that one of the servers 406, 410, 414 containing a copy of the data item 418 can drop a copy in local cache when it receives an invalidate request from a client, and can send a message on multicast to the other servers on the network to drop any copy of the value in local cache.

Another problem exists due to the fact that a multicast message is only sent once by the source and does not wait for confirmation of receipt by the other servers. A server in the cluster might not get an invalidate request, such as if it is temporarily offline. A system in accordance with the present invention can provide a more reliable multicast by tagging each such message or request with a version number or sequential number. In this way, a server receiving a request will know the version of the request, as well as the version of the last request it received, such that the server will know if it missed a message. Once a server determines that it has missed a message, it can request that the message be sent again so that it can update accordingly.

One problem with this approach, however, is that a server will not know it has missed an update until another update is sent. In certain applications such as an on-line store posting weekly specials for weeks 1, 2, and 3, it may be unacceptable to wait until the next update to get correct information. The store would not realize that it had missed the specials for week 2 until the update for week 3. The week 1 specials would have remained up during week 2, displaying the wrong information to any user accessing the system during that time. When the system realizes that it missed the week 2 update, it will already be week 3. The server will end up simply discarding the week 2 information without the information ever having been displayed to a user.

A system in accordance with the present invention can get around this problem by periodically "heartbeating" information to the servers in the cluster. A server heartbeats a packet of information or a message by sending the message periodically over the network or cluster. A heartbeat message can contain information such as the latest version number, previous version numbers, or the actual update information itself if the update information is small enough to be practical. If a server receives a heartbeat message containing the latest version number, and the server is not on that version of the data or did not receive the latest invalidate request, the server can request or pull the invalidate message from the server.

The initiating server that initially sent the invalidate request, which may also be the server sending the multicast and/or heartbeats, can store recent requests for a certain amount of time or can store a certain number of recent requests. If a cluster server requests an invalidate message that the initiating server is still storing, the initiating server can simply send the message to the cluster server, by a method such as a multicast or a point-to-point connection. If the initiating server no longer has the message, the initiating server can tell the cluster server to simply drop its entire cache, since it is not possible to tell the cluster server which keys have changed. The cluster server can read new and/or current information from the database. This can temporarily lessen performance, but the newly-cached information will at least be current with the information in the database.

In operation, a client or application can update a data item through a read/write entity bean. The update, or a transaction containing multiple updates, will commit to the database. An invalidate message can be sent to the servers in the cluster, with the message being triggered for example by the client or server updating the data item. The cluster servers can each drop any copy in local cache and can read in the new value from the database, either right away, later, or when necessary to serve a request. Normally it is not possible to read uncommitted data, so it may be preferable to use a two-step process where the data is committed first and then a message is multicast to the cluster.

One problem with the above approach is that it forces a client to initiate an invalidate request, which can involve a little more complexity for the client. There is also the possibility that the client could use the invalidate method incorrectly or make a mistake. It may therefore be preferable that the system can do it automatically.

A system in accordance with the present invention can address this problem by using an "invalidation target." An invalidation target is based on the idea that the read-only and read/write beans point to the same data in the database, with the people reading the data using the read-only bean and the people updating the data using the read/write bean. The idea is to invalidate the read-only bean when the read/write bean is updated or modified.

When deploying an entity bean or enterprise JavaBean, there is typically a deployment descriptor used to store meta data about the actual entity bean. A deployment descriptor can be, for example, an XML document used to provide information about the services provided by the bean that should be made available to clients. The information can provide a wide variety of information to the clients, such as request routing information, as well as method and class details for a supporting Java class. A tag can be added to the deployment descriptor, referred to previously as an "invalidation target." The invalidation target for a read/write bean can contain the identity of any associated read-only bean. The invalidation target can be used to automatically invalidate any associated read-only bean(s) when the read-only bean is updated.

In one embodiment, the invalidation target can be updated when a server requests information from a read/write bean or generates a read-only bean does the request. When the read/write bean forwards information from a database or data store to the requesting server, the read/write bean can also update the invalidation target. An XML file stored on the server containing the read/write bean can be updated to include the identity of the server requesting the information or creating the bean.

Figure 3:
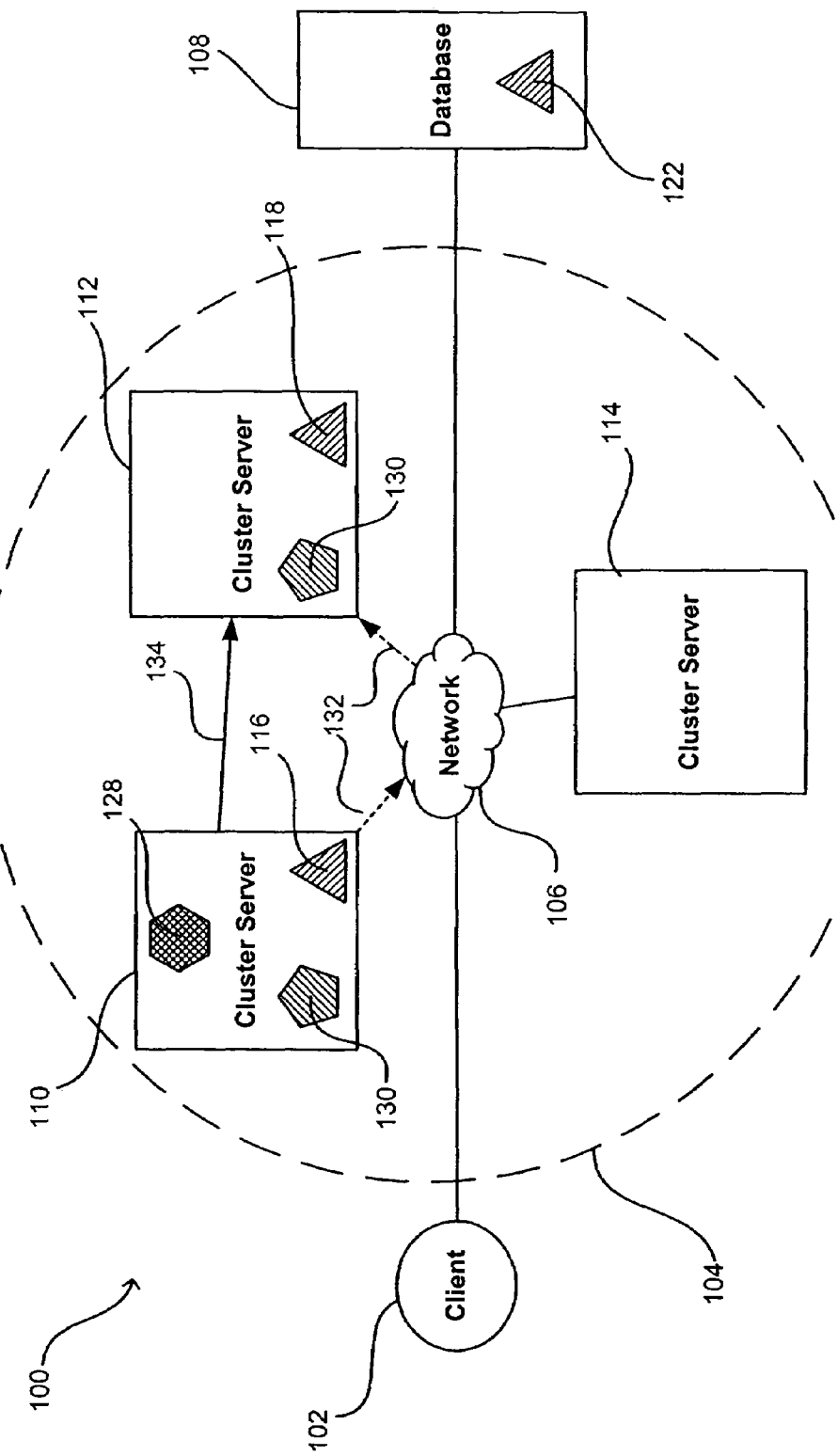
FIG. 3 is a diagram of an alternative embodiment of the system of FIG. 1.

FIG. 3 again shows the system 100 of FIG. 1, except in this embodiment the system is shown taking advantage of an invalidation target. Whenever a read/write bean 128 is used to update a data item 122, the system can look to the invalidation target associated with that read/write bean 128 and send an invalidate request to each read-only bean 130 associated with that read/write bean. The invalidate request can be acted on directly by server 110, which contains both the read/write bean 128 and a read-only bean 130. The invalidate request can also be sent by any appropriate protocol to other servers containing a read-only bean 130, which would be in the invalidation target. In one approach, server 110 contacts server 112 directly by a point-to-point connection 134, telling the read-only bean 130 on server 112 to drop the cached copy 118 on server 112. In another approach, server 110 can send a multicast message 132 over the network 106 to any server which contains a read-only bean 130 within the scope of the invalidation target, such as server 112.

A subsequent call to an invalidated read-only bean can cause a method such as ejbLoad to be called, which can read current information from the database into cache. For example, a container-managed persistence (CMP) bean, an entity bean whose state is automatically synchronized with a database, can use an invalidation-target element in an XML file such as ejb-jar.xml to specify a read-only entity bean that should be invalidated when the read/write bean has been modified. The container in this example can automatically invalidate the invalidation-target, such as after the transaction is completed.

Figure 4:
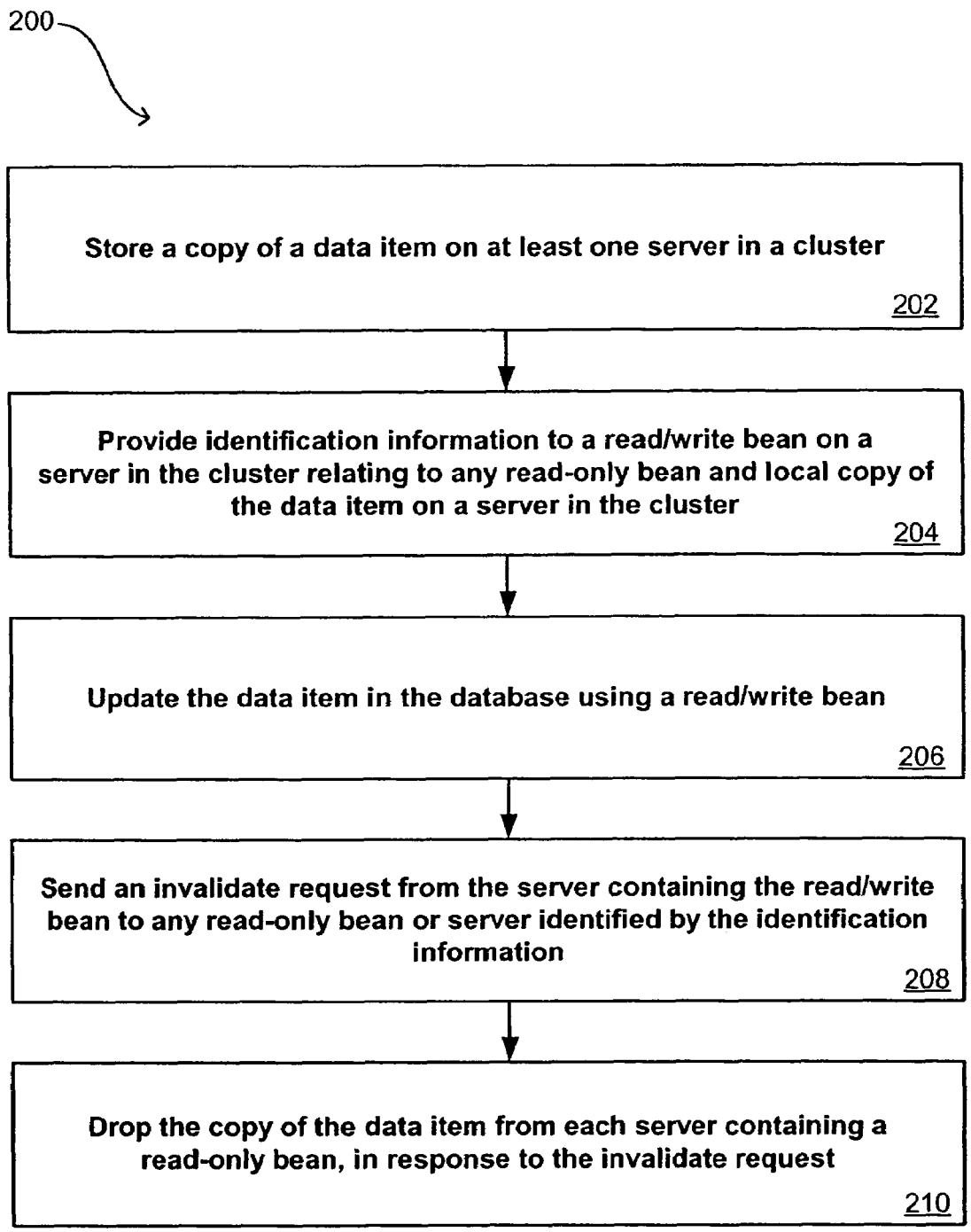
FIG. 4 is a flowchart for a method in accordance with one embodiment of the present invention.

Such a method 200 is shown in the flowchart of FIG. 4. A copy of a data item is stored on at least one server in a network cluster 202. Identification information, or an invalidation target, is provided to a read/write bean on a server in the cluster, the information relating to any server in the cluster containing a read-only bean and a local copy of the data item 204. The data item can be updated in the database using a read/write bean 206. An invalidation request can be sent from the server containing the read/write bean to any server identified by the identification information 208. The copy of the data item can then be dropped by each server receiving the request 210.

In this way, customers or clients do not have to write any additional code to invalidate an item. In accordance with an embodiment of the present invention, only an invalidation target must be specified in order to keep the read/write and read-only beans coherent. The beans can coexist on the same server, with the read-only bean reading items from local cache and the read/write bean reading from, and writing to, the database.

In order to improve performance, a system in accordance with the present invention can instead wait until an entire transaction or series of updates is committed to the database or data table, instead of sending an individual message for each update. A server, such as the server initiating the update, can keep track of which keys were updated during the transaction and multicast a single message that includes information for all updated primary keys. Such batching of messages can improve the overall performance of such a system and can reduce the opportunity for error or inconsistencies.

One example of a system that can be used in accordance with the present invention contains a table of stock symbols, as well as information associated with each symbol, such as price and volume. A Java server page can be used to allow a user to request the current price of a stock. The Java server page can read the information from a read-only entity enterprise Java bean. A Java Message Service (JMS) queue can receive messages with updates to stock prices. An message-driven bean can de-queue these messages and update the associated CMP entity bean. When this modification occurs, the container can invalidate the associated read-only bean.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for maintaining a cached copy of a data item in a database, said method comprising:
   receiving a request to access the copy of the data item, wherein said data item is stored in the database and wherein said copy of the data item is cached in a computer readable storage medium of a first server;
   providing read access to the copy of the data item responsive to the request; and
   updating the copy cached in said first server by reading from the data item stored in the database according to a timeout mechanism;
   repeatedly performing the receiving, providing and updating steps until an invalidate request is received from a second server to the first server, said invalidate request including identification information that identifies at least one of: the first server, the copy cached in said first server and the data item, wherein the invalidate request instructs the first server to drop a specific copy of data upon receipt of the invalidate request; and
   dropping the copy of the data item from the computer readable storage medium of said first server if the identification information included in the invalidate request matches identification information assigned to the copy of the data item; and
   reading the data item from the database and storing a new updated copy of said data item in the computer readable storage medium of said first server upon having received the invalidate request and having dropped the copy of the data item.

2. The method of claim 1, further comprising:
   causing at least one additional server to drop a locally kept copy of the data item in the database by sending a second invalidate request to a peer associated with the at least one additional server.

3. The method of claim 1, wherein updating The copy from the data item stored in the database according to a timeout mechanism comprises:
   detecting passage of a timeout value associated with the data item; and
   reading a current value for the copy from the data item in the database.

4. The method of claim 2, further comprising:
   tagging each one of the invalidate request and the second invalidate request with a version number that the at least one additional server can use to determine if all invalidate requests have been received.

5. The method of claim 1, wherein updating the copy from the data item stored in the database according to a timeout mechanism comprises:
   receiving a heartbeat message including a latest value for the data item stored in the database and a version number;
   determining that an invalidate request message has been missed by comparing the version number from the heartbeat message with a version number of a previously received invalidate message or heartbeat message; and
   requesting a copy of an invalidate request message That was missed.

6. The method of claim 5, further comprising:
   receiving a message indicating that the invalidate message that was missed is no longer available;
   dropping the copy of the data item; and
   obtaining a new copy of the data item from the database.

7. The method of claim 2, wherein causing at least one additional server to drop a locally kept copy of the data item in the database by sending at least one invalidate request to a peer associated with the at least one additional server comprises:
   sending a multicast invalidate request message to a plurality of servers in a cluster of servers.

8. The method of claim 7, further comprising:
   periodically multicasting the invalidate request message across the duster.

9. The method of claim 1, wherein updating the copy from the data item stored in the database according to a timeout mechanism comprises:
  receiving an indication that each of a plurality of data hems in the database has been updated to an update value; and
  dropping at least one of a plurality of copies of the data items in the database.

10. The method of claim 9, wherein receiving an indication that each of a plurality of data items in the database has been updated to the update values value comprises:
  receiving a message that includes information for updated primary keys associated with each of a Urn plurality of data items in the database that has been updated to the update value.

11. A computer-readable storage medium carrying one or more sequences of instructions for maintaining a cached copy of a data item in a database, which Instructions, when executed by one or more processors, cause the one or more processors to carry out the steps of:
  receiving a request to access the copy of the data item, wherein said data item is stored in the database and wherein said copy of the data item is cached in a first server;
  providing read access to the copy of the data item responsive to the request; and
  updating the copy cached in said first server by reading from the data item stored in the database according to a timeout mechanism;
  repeatedly performing the receiving, providing and updating steps until an invalidate request is received from a second server to the first server, said invalidate request including identification information that identifies at least one of: the first server, the copy cached in said first server and the data item, wherein the invalidate request instructs the first server to drop a specific copy of data upon receipt of the invalidate request; and
  dropping the copy of the data item from the first server if the Identification information included in the invalidate request matches identification information assigned to the copy of the data item; and
  reading the data item from the database and storing a new updated copy of said data item in the first server upon having received the invalidate request and having dropped the copy of the data item.

12. The computer-readable storage medium of claim 11, further comprising instructions for carrying out the steps of:
  causing at least one additional server to drop a locally kept copy of the data item in the database by sending a second invalidate request to a peer associated with the at least one additional server.

13. The computer-readable storage medium of claim 11, wherein the instructions for carrying out the step of updating the copy from the data item stored in the database according to a timeout mechanism further comprise instructions for carrying out the steps of:
  detecting passage of a timeout value associated with the data item; and
  reading a current value for the copy from the data item in the database.

14. The computer-readable storage medium of claim 12, further comprising instructions for carrying out the steps of:
  tagging each one of the invalidate request and the second invalidate request with a version number that the at least one additional server can use to determine if all invalidate requests have been received.

15. The computer-readable storage medium of claim 11, wherein the instructions for carrying out the step of updating the copy from the data item stored in the database according to a timeout mechanism further comprise instructions for carrying out the steps of:
  receiving a heartbeat message including a latest value for the data item stored in the database and a version number;
  determining that an invalidate request message has been missed by comparing the version number from the heartbeat message with a version number of a previously received invalidate message or heartbeat message; and
  requesting a copy of an invalidate request message that was missed.

16. The computer-readable storage medium of claim 15, further comprising instructions for carrying out the steps of:
  receiving a message indicating that the invalidate message that was missed is no longer available;
  dropping the copy of the data item; and
  obtaining a new copy of the data item from the database.

17. The computer-readable storage medium of claim 12, wherein the instructions for carrying out the step of causing at least one additional server to drop a locally kept copy of the data item in the database by sending at least one invalidate request to a peer associated with the at least one additional server further comprise instructions for carrying out the steps of:
  sending a multicast invalidate request message to a plurality of servers in a cluster of servers.

18. The computer-readable storage medium of claim 17, further comprising instructions for carrying out the steps of:
  periodically multicasting the invalidate request message across the cluster.

19. The computer-readable storage medium of claim 11, wherein the instructions for carrying out the step of updating the copy from the data item stored in the database according to a timeout mechanism further comprise instructions for carrying out the steps of:
  receiving an indication that each of a plurality of data items in the database has been updated to an update value; and
  dropping at least one of a plurality of copies of the data Items in the database.

20. The computer-readable storage medium of claim 19, wherein the instructions for receiving an indication that each of a plurality of data items in the database has been updated to the update value further comprise instructions for carrying out the steps of:
  receiving a message that includes information for updated primary keys associated with each of the plurality of data items in the database that has been updated to the update value.

* * * * *

UNITED STATES PATENT AND TRADEMARK OFFICE
CERTIFICATE OF CORRECTION

PATENT NO. : 7,293,009 B2  
APPLICATION NO. : 11/105263  
DATED : November 6, 2007  
INVENTOR(S) : Dean Bernard Jacobs et al.

Page 1 of 1

It is certified that error appears in the above-identified patent and that said Letters Patent is hereby corrected as shown below:

Col. 9, line 14, delete "Urn"  
Col. 9, line 15, replace "value" with --values--

Signed and Sealed this

Thirteenth Day of May, 2008

JON W. DUDAS  
*Director of the United States Patent and Trademark Office*

UNITED STATES PATENT AND TRADEMARK OFFICE
CERTIFICATE OF CORRECTION

| | | |
|---|---|---|
| PATENT NO. | : 7,293,009 B2 | Page 1 of 1 |
| APPLICATION NO. | : 11/105263 | |
| DATED | : November 6, 2007 | |
| INVENTOR(S) | : Jacobs et al. | |

It is certified that error appears in the above-identified patent and that said Letters Patent is hereby corrected as shown below:

Title Page, Item (56)
On sheet 2, under Other Publications, insert -- Bainbridge, A., "CICS and Enterprise JavaBeans," IBM Systems Journal, Volume 40, Number 1, Pages 1-19 (2001). --

Title Page, Item (56)
On sheet 2, under Other Publications, insert -- Rana, Ajaz, et al., "Java Junction," Intelligent Enterprise, http://www.intelligententerprise.com//channels/integration/feature/010416/feat1.jhtml, April 16, 2001, 9 Pages. --

In column 1, line 8, after "2002" insert -- , --.

In column 4, line 12, delete "invalidate (Object pk)" and insert -- invalidate(Object pk) --, therefor.

In column 7, line 37, delete "An" and insert -- A --, therefor.

In column 8, line 25, in claim 3, after "updating" delete "The" and insert -- the --, therefor.

In column 8, line 49, in claim 5, delete "That" and insert -- that --, therefor.

In column 8, line 67, in claim 8, delete "duster." and insert -- cluster. --, therefor.

In column 9, line 5, in claim 9, delete "hems" and insert -- items --, therefor.

In column 9, line 11, in claim 10, after "update" delete "values".

In column 9, line 18, in claim 11, delete "Instructions," and insert -- instructions, --, therefor.

In column 9, line 39, in claim 11, delete "Identification" and insert -- identification --, therefor.

In column 10, line 50, in claim 19, delete "Items" and insert -- items --, therefor.

Signed and Sealed this

Sixteenth Day of March, 2010

David J. Kappos
*Director of the United States Patent and Trademark Office*